(12) United States Patent
George et al.

(10) Patent No.: US 11,344,833 B2
(45) Date of Patent: May 31, 2022

(54) FILTER SECURING MECHANISM AND ATTACHMENT METHOD

(71) Applicant: Parker-Hannifin Corporation, Cleveland, OH (US)

(72) Inventors: Jonathan Robert George, Laval (CA); Alfin Leo, Laval (CA); Pierre Laforge, St-Lin des Laurentides (CA)

(73) Assignee: Parker-Hannifin Corporation, Cleveland, OH (US)

( * ) Notice: Subject to any disclaimer, the term of this patent is extended or adjusted under 35 U.S.C. 154(b) by 895 days.

(21) Appl. No.: 15/765,510

(22) PCT Filed: Oct. 5, 2016

(86) PCT No.: PCT/US2016/055542
§ 371 (c)(1),
(2) Date: Apr. 3, 2018

(87) PCT Pub. No.: WO2017/062486
PCT Pub. Date: Apr. 13, 2017

(65) Prior Publication Data
US 2018/0280853 A1    Oct. 4, 2018

Related U.S. Application Data

(60) Provisional application No. 62/237,007, filed on Oct. 5, 2015.

(51) Int. Cl.
*B01D 46/00* (2022.01)
*B01D 46/02* (2006.01)

(52) U.S. Cl.
CPC ......... *B01D 46/0005* (2013.01); *B01D 46/02* (2013.01); *B01D 2265/028* (2013.01)

(58) Field of Classification Search
None
See application file for complete search history.

(56) References Cited

U.S. PATENT DOCUMENTS 2,308,310 A * 1/1943 Ruemelin, Jr. ........ B01D 46/02
                                                    285/148.13
3,457,707 A    7/1969 Fesco
(Continued)

FOREIGN PATENT DOCUMENTS

DE        89 02 834 U1     6/1989
EP        2 080 546 A2     7/2009
WO        2014/207705 A1   12/2014

OTHER PUBLICATIONS

International Search Report and Written Opinion for corresponding Patent Application No. PCT/US2016/055542 dated Jan. 31, 2017.

*Primary Examiner* — Christopher P Jones
*Assistant Examiner* — Brit E. Anbacht
(74) *Attorney, Agent, or Firm* — Renner, Otto, Boisselle & Sklar, LLP

(57) ABSTRACT

A securing mechanism and a method for securing a filter element within a housing may be implemented in a pocket-type or cartridge-type filter assembly. The securing mechanism includes a mating frame having a retaining portion extending into the filter element within the housing for retaining the filter element within the housing, and a mounting portion mounted to the housing. The securing mechanism includes a semi-rigid member having opposite ends that are each secured to the mounting portion of the mating frame and a flexible portion between the opposite ends that is flexibly moveable to constrain the semi-rigid member at the opposite ends. The semi-rigid member is pressed against the mating frame to hold the filter element in place when the semi-rigid member is constrained.

16 Claims, 4 Drawing Sheets

(56) References Cited

U.S. PATENT DOCUMENTS

| | | | | |
|---|---|---|---|---|
| 3,830,042 A * | 8/1974 | MacDonnell | B01D 46/523 | 55/341.4 |
| 4,015,961 A * | 4/1977 | Howard | B01D 46/02 | 55/378 |
| 4,187,091 A * | 2/1980 | Durre | B01D 46/2411 | 210/493.1 |
| 4,225,328 A * | 9/1980 | Stiehl | B01D 46/02 | 55/378 |
| 4,292,057 A * | 9/1981 | Ulvestad | B01D 46/0005 | 55/302 |
| 5,173,098 A * | 12/1992 | Pipkorn | B01D 46/06 | 55/294 |
| 5,290,441 A * | 3/1994 | Griffin | B01D 46/06 | 210/232 |
| 5,476,526 A * | 12/1995 | Attermeyer | B01D 46/4263 | 55/496 |
| 5,536,290 A * | 7/1996 | Stark | B01D 46/2414 | 55/498 |
| 5,746,792 A * | 5/1998 | Clements | B01D 46/02 | 55/341.1 |
| 5,792,229 A * | 8/1998 | Sassa | B01D 46/0001 | 55/497 |
| 6,726,735 B1 * | 4/2004 | Oussoren | B01D 46/0005 | 210/473 |
| 7,128,771 B2 | 10/2006 | Harden | | |
| 7,186,284 B2 * | 3/2007 | Clements | B01D 46/0005 | 55/341.1 |
| 7,901,476 B2 * | 3/2011 | Kao | B01D 46/523 | 55/379 |
| 8,241,381 B2 * | 8/2012 | Braunecker | B01D 46/0013 | 55/483 |
| 8,580,004 B1 * | 11/2013 | Clements | B01D 46/521 | 55/360 |
| 8,628,605 B2 | 1/2014 | Doehla | | |
| 8,834,591 B2 * | 9/2014 | Rafi | B01D 46/12 | 55/484 |
| 10,040,012 B2 * | 8/2018 | McPheat | B01D 46/0005 | |
| 10,092,870 B2 * | 10/2018 | Sweet | B01D 46/0019 | |
| 10,758,854 B2 * | 9/2020 | Weisbach | B01D 46/023 | |
| 2004/0237483 A1 * | 12/2004 | Clements | B01D 46/2411 | 55/341.1 |
| 2014/0020345 A1 | 1/2014 | Schwarzl et al. | | |

* cited by examiner

FILTER SECURING MECHANISM AND ATTACHMENT METHOD

This application is a national phase of International Application No. PCT/US2016/055542 filed Oct. 5, 2016 and published in the English language, which claims priority to U.S. Provisional Application No. 62/237,007 filed Oct. 5, 2015, which are hereby incorporated herein by reference.

FIELD OF INVENTION

The present invention relates generally to a device for separating contaminant particles from a fluid stream, such as a filter assembly, and securing devices for attaching different components of a filter assembly.

BACKGROUND OF THE INVENTION

Various applications require filtration for separating contaminant particles from a stream of fluid. Filtration is generally performed using a filter assembly that contains a filter media through which the contaminated stream flows. In an exemplary filter assembly, such as an air bag filter for locomotives and other applications, a bag housing may contain multiple filter bags. Conventionally-used tools or components for holding the filter bag within the housing include nuts, bolts, lock bars, clips, tie rods, springs, and clamps. The external components may require removal during replacement of the filter bags, such that removing the external components may require an additional step in the filter bag replacement process. Thus, using external components to secure the filter bag within the housing may result in an overall slower and more complex process for replacing filter bags within the bag housing.

SUMMARY OF THE INVENTION

The present application is directed towards providing a securing mechanism for securing a pocket filter within a housing. The securing mechanism may include a frame that is engageable with the pocket filter and the housing for supporting the pocket filter within the housing. The frame may include a semi-rigid portion attached to the filter element. The semi-rigid portion may be flexibly moveable relative to the housing, such that the pocket filter may be in a secured position when the semi-rigid portion is constrained. Using a semi-rigid frame may be advantageous in that the frame may be quickly snapped into and out of engagement with the housing, enabling a less complex process for replacing filter bags as compared with using external components. The semi-rigid frame may also enable the filter assembly to be self-sealing and self-supporting without using additional components.

According to an aspect of the invention, a securing mechanism may be used for securing a filter element within a housing. The securing mechanism may include a mating frame having a retaining portion extending into the filter element within the housing for retaining the filter element within the housing. The mating frame has a mounting portion mounted to the housing. The securing mechanism further includes a semi-rigid member having opposite ends that are each secured to the mounting portion of the mating frame and a flexible portion between the opposite ends that is flexibly moveable to constrain the semi-rigid member at the opposite ends. The semi-rigid member is pressed against the mating frame to hold the filter element in place when the semi-rigid member is constrained.

According to another aspect of the invention, a filter assembly may include a housing having a closed end and an open end, a filter media receivable within the open end of the housing, the filter media having a first end near the open end of the housing and a second end near the closed end of the housing, and a frame member engageable with the first end of the filter media and the open end of the housing for securing the filter media within the housing, the frame member including a semi-rigid planar member that is engageable with the first end of the filter media and flexibly moveable between an unconstrained position and a constrained position. When in the constrained position, the semi-rigid planar member compresses the first end of the filter media against the housing for holding the filter media in place.

According to another aspect of the invention, a method of securing a filter element within a housing may include steps of attaching a frame at an end of the housing that is engageable with a portion of the filter element for retaining the filter element within the housing, the frame including a semi-rigid member that is flexibly moveable from an unconstrained position to a constrained position, and flexibly moving the semi-rigid member to the constrained position to constrain the semi-rigid member and compress a portion of the filter element against the housing.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
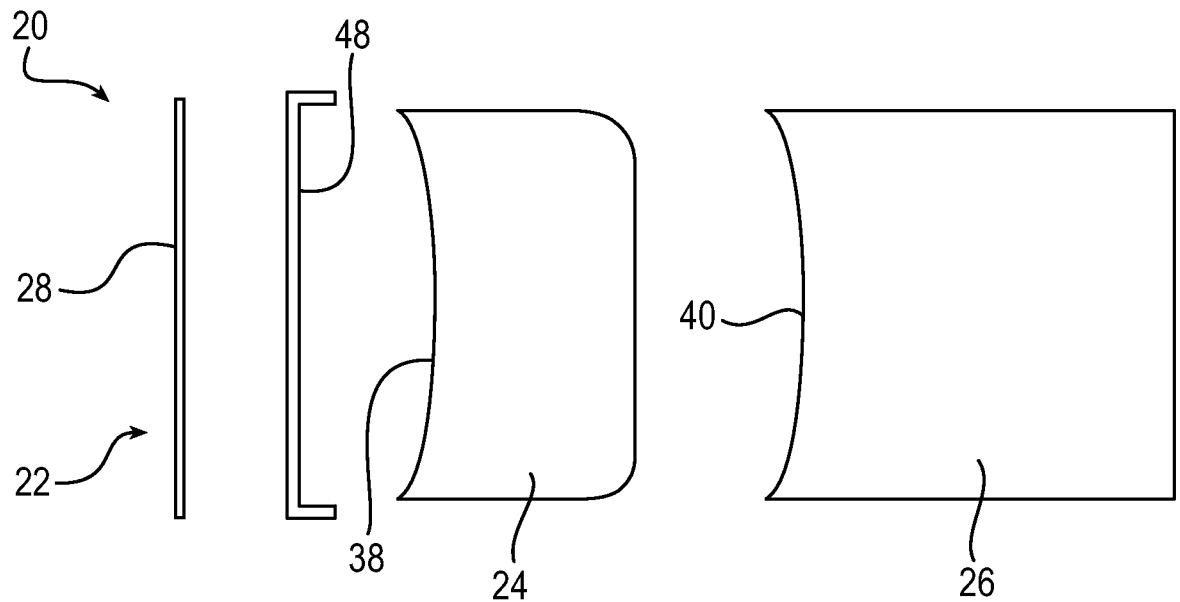
FIG. 1 is a schematic drawing depicting an exploded sectional view of a filter assembly having a housing, a filter element, and a semi-rigid member.

The principles of the present application have particular application in pocket-type filters or bag filters for rail or locomotive applications. Other suitable applications may include any application using filter assemblies for large diesel engine combustion air, gas turbine or other power generation air filtration. Still other suitable applications may include transportation, marine, mining, and other industrial processes. The filter element according to the present application may be implemented in any suitable filter assembly. Pocket-type filters and cartridge-type filters are examples of suitable filter assemblies. The filter assembly may include a housing, a filter element, and a securing mechanism for retaining the filter element within the housing. The securing mechanism may be a semi-rigid member having a flexible portion that is flexibly moveable to constrain the semi-rigid member and retain the filter element within the housing.

Referring now to FIGS. 1-4, a side view of a filter assembly 20 having a securing mechanism 22 for securing a filter element 24 within a housing 26 is schematically shown. The housing 26 may have any shape and dimensions that are suitable for retaining a corresponding filter element within the filter assembly 20. The filter element 24 may have a shape and dimensions that are complementary to the shape and dimensions of the corresponding filter housing 26. For example, in a cartridge-type filter assembly the housing 26 may be cylindrical, and in a pocket-type filter assembly the housing 24 may be rectangular. The filter element 24 may be formed of any suitable filtration media and the material of the filtration media may be dependent on the application. Examples of suitable materials include natural or synthetic polymeric materials, such as polyester-based materials, nylon, and polypropylene. A bag-type filter element for a pocket-type filter assembly may be formed of fiberglass. The filter element 24 may also be coated with a viscous adhesive to enhance the dirt holding capacity of the filter element 24. The aforementioned materials are merely examples of suitable materials and many other suitable materials may be used.

The securing mechanism 22 may include a semi-rigid or flexible member 28, such that the securing mechanism 22 may be flexibly moveable or bendable. The semi-rigid member may have a clip style shape such that the semi-rigid member may be unconstrained and constrained to retain the filter element 24 within the housing 24. The semi-rigid member 28 may be flexibly moveable between a first position and a second position, where the first position may correspond to an uninstalled state of the filter assembly 20 and the second position may correspond to an installed state of the filter assembly 20. The semi-rigid member 28 may be formed of any suitable semi-rigid material. Examples of suitable materials include synthetic plastic polymers, such as polyethylene, polypropylene, polyurethane, nylon, and polyvinyl chloride. Flexible epoxy resin materials, flexible metal materials, or rubber may also be suitable. The aforementioned materials are merely examples of suitable materials and many other suitable materials may be suitable for the semi-rigid member 28.

Figure 2:
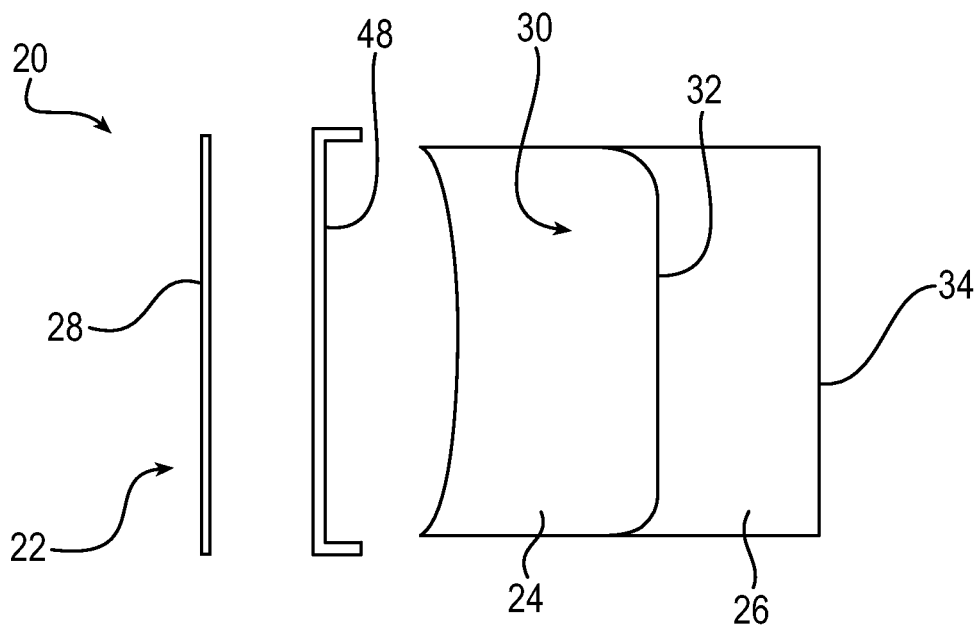
FIG. 2 is a schematic drawing depicting a sectional view of the filter assembly of FIG. 1 showing the filter element received within the housing.

FIG. 1 shows the uninstalled state of the filter assembly 20 with the components shown in an exploded view. In the uninstalled state, the semi-rigid member 28 may be in an unconstrained or rest position such that the semi-rigid member 28 is not flexed or bended. In the uninstalled state, the filter element 24 may be insertable into or removable from the housing 26. FIG. 2 shows a partially installed state of the filter assembly 20, where the filter element 24 is inserted or received within a chamber 30 of the housing 26. The filter element 24 may extend to a predetermined depth of the chamber 30 such that a gap exists between a bottom portion 32 of the filter element 24 and a bottom portion 34 of the housing 26. The bottom portion 34 of the housing 26 may be a closed end that is distally opposite an open end of the housing 26 where the filter element 24 is received. As best shown in FIG. 1, a top portion 38 of the filter element 24 may have a contour that is complementary in shape to the contour of a top portion 40 of the housing 26. The filter element 24 may be a bag-type filter that has a free hanging end within the chamber 30 of the housing 26.

Figure 3:
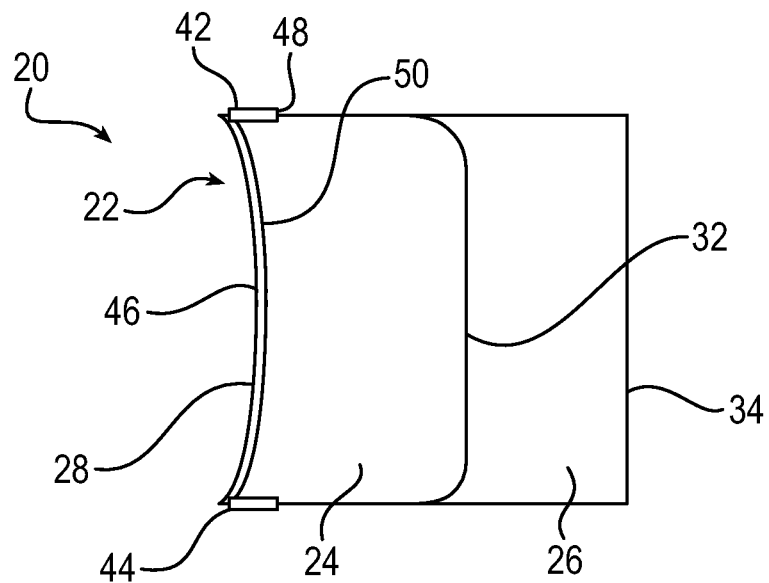
FIG. 3 is a schematic drawing depicting a sectional view of the filter assembly of FIG. 2 showing the semi-rigid member retaining the filter element within the housing.
Figure 4:
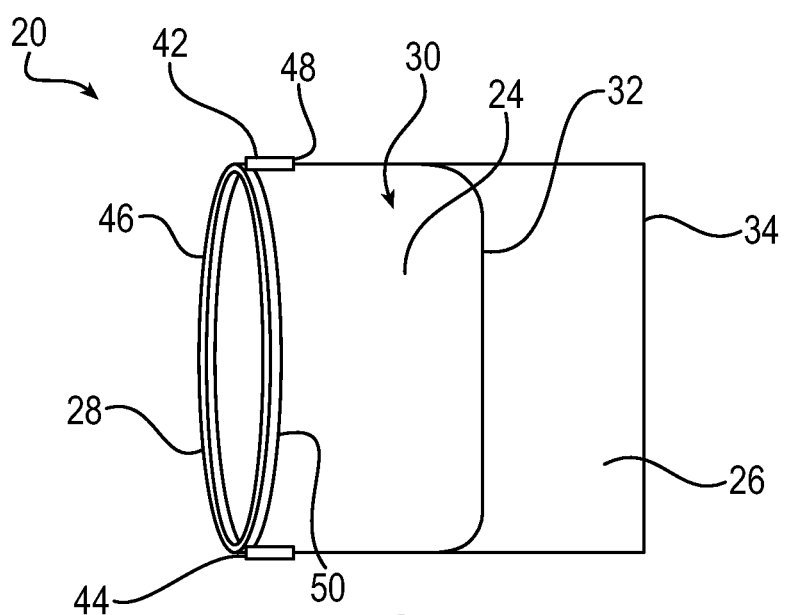
FIG. 4 is a schematic drawing depicting a sectional view of the filter assembly of FIG. 3 showing the semi-rigid member arched outwardly for retaining the filter element within the housing.

FIGS. 3 and 4 show the installed state of the filter assembly 20, where the semi-rigid member 28 is constrained to hold the filter element 24 in place. In the installed state, the semi-rigid member 28 may be flexed or bent to constrain the semi-rigid member 28. The semi-rigid member 28 may have a first end 42, a second end 44 distally opposite the first end 42, and a flexible portion 46 connecting the first end 42 and the second end 44. The securing mechanism 20 may include a mating frame 48. The mating frame 48 may be formed of any suitable rigid material and may have a mounting portion that is mounted to an exterior portion of the housing 26.

The first end 42 and the second end 44 of the semi-rigid member 28 may be fixed to the mating frame 48 when the filter assembly 20 is in the installed position and/or the uninstalled position. The first end 42 and the second end 44 may be fixed to the mating frame 48 via any suitable fastening mechanism, such as screws, bolts, pins, hooks, or clamps. Any suitable fastening mechanism may be used. One of the first end 42 and the second end 44 may be detachable from the mating frame 48 when the filter assembly 20 is in the uninstalled position, such that attaching the loose end to the mating frame 48 may constrain the flexible portion 46 via fixing both ends 42, 44 of the semi-rigid member 28. The flexible portion 46 may be moveable between an unconstrained position, as shown in the uninstalled filter assembly 20 of FIGS. 1 and 2, and a constrained position, as shown in the installed filter assembly 20 of FIGS. 3 and 4. The flexible portion 46 may be bendable to move between the unconstrained position and the constrained position. The flexible portion 46 may be bendable or "snapped" into the constrained position. The flexible portion 46 may be manually bendable. When one of the ends 42, 44 is detached from the mating frame 48 and the other end is fixed to the frame, the detached end 42, 44 may be snapped to or against a corresponding portion of the mating frame 48 to constrain the semi-rigid member 28.

When the filter assembly 20 is in the installed state, the semi-rigid member 28 may be arched or concaved between the first end 42 and the second end 44. As shown in FIG. 3, the flexible portion 46 of the semi-rigid member 28 may be arched or concaved inwardly towards the bottom portion 34 of the housing 26. The flexible portion 46 may follow a contour of the housing 26 or the mating frame 48. The filter element 24 may be attached to the mating frame 48 via any suitable attachment mechanism. Examples of suitable attachment means may include an adhesive or mechanical attachment mechanism. The filter element 24 may be in the form of a pocket filter where a top portion 50 of the pocket-type filter element 24 may be located opposite the bottom portion 32 of the filter element 26. The top portion 50 may be attached to a portion of the mating frame 48. When the arched flexible portion 46 is constrained, the flexible portion 46 may press against the mating frame 48 for holding the filter element 26 in the chamber 30 of the housing 26. The semi-rigid member 28 may be in the form of a spring seal such that the semi-rigid member 28 may be constrained and sealed against the mating frame 48. The semi-rigid member 28 may be configured to seal the filter element 28 against the mating frame 48.

As shown in FIG. 4, the flexible portion 46 of the semi-rigid member 28 may be constrained in a direction away from the housing 26, when the filter assembly 20 is in the installed state. The flexible portion 46 of the semi-rigid member 28 may be convex as opposed to concave, such that a tension is created on the filter element 24. The filter element 24 may be attached to the semi-rigid member 28 for holding the filter element 24 in place within the chamber 30 of the housing 26. In an exemplary configuration, the filter element 24 may be attached to the securing mechanism 22 at the first end 42 and the second end 44 of the semi-rigid member 28.

Referring now to FIGS. 5-8, a pocket or bag-type filter assembly 52 is shown. The pocket filter assembly 52 may be a rectangular face single pocket filter for use in engine combustion. The pocket filter assembly 52 may include a housing 54, a filter element 56, and a securing mechanism 58 for securing the filter element 56 within the housing 54 when the pocket filter assembly 52 is in an installed state. In an exemplary configuration, the filter element 56 may be pleated, such that the filter element 56 has more than one layer of filter media. The filter element 56 may be received within the housing 54, via an open end 60 of the housing 54. The filter element 56 may include a first end 60 that is located near a receiving end 62 of the housing 54. The securing mechanism 58 may include a frame member 64 that is engageable with the first end 60 of the filter element 56 and the receiving end 62 of the housing 54 for securing the filter element 56 within the housing 54. The frame member 64 may include a semi-rigid planar member 66 that is engageable with the first end 60 of the filter element 56 and flexibly moveable between an unconstrained position and a constrained position. When in the constrained position, the semi-rigid planar member 66 may compress the first end 60 of the filter element 56 against the housing 54 for holding the filter element 56 in place.

Figure 5:
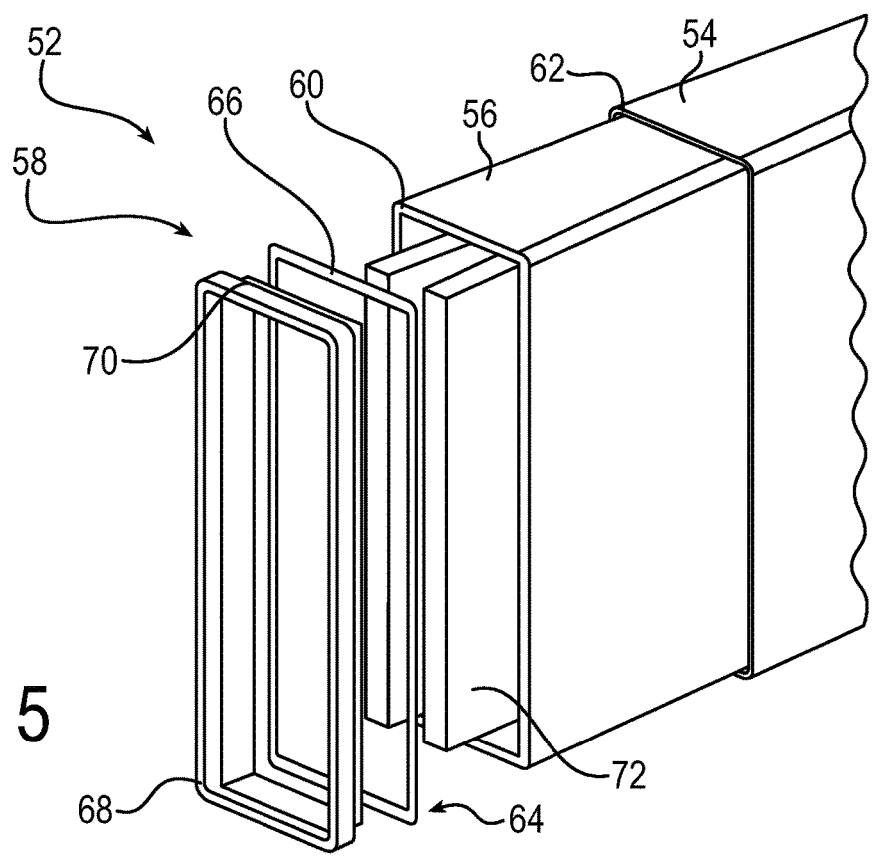
FIG. 5 is a schematic drawing depicting an exploded view of an exemplary embodiment of a pocket filter assembly.
Figure 6:
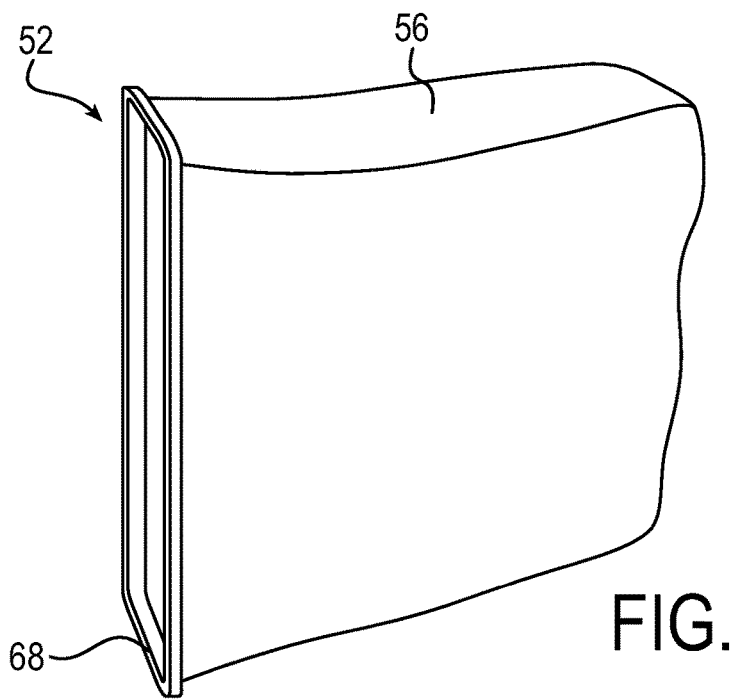
FIG. 6 is a drawing depicting a perspective view of a pocket filter.

The semi-rigid planar member 66 may include a sealing surface for sealing the first end 60 of the filter element 56 with the frame member 64. The semi-rigid planar member 66 may be formed of any suitable semi-rigid or flexible material, as previously described. An example of a suitable material may be a semi-rigid metallic material. The semi-rigid planar member 66 may have any suitable shape. For example, the semi-rigid planar member 66 may be rectangular in shape and have a shape that is complementary to a contour of the receiving end 62 of the housing 54. As best shown in FIGS. 5 and 6, the frame member 64 may include a textile cuff 68 that surrounds the first end 60 of the filter element 56. The textile cuff 68 may be made of any suitable soft textile material. The textile cuff 68 may include an interior portion 70 that retains the semi-rigid planar member 66.

Figure 7:
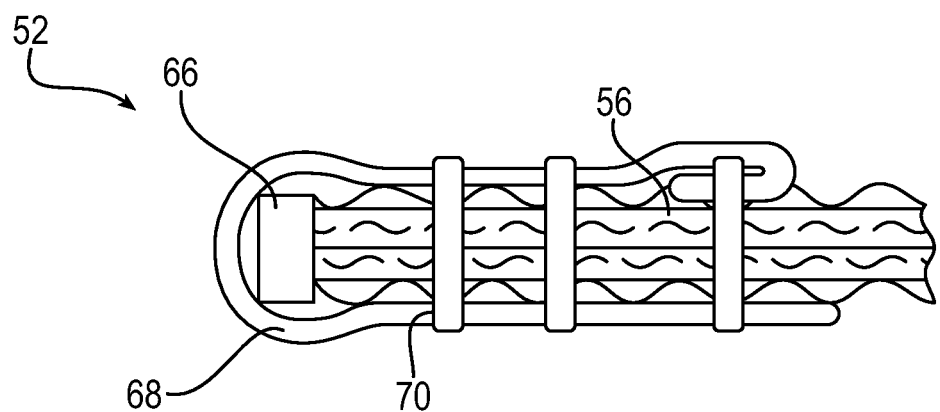
FIG. 7 is a schematic drawing depicting a detailed sectional view of a portion of pocket filter assembly.
Figure 8:
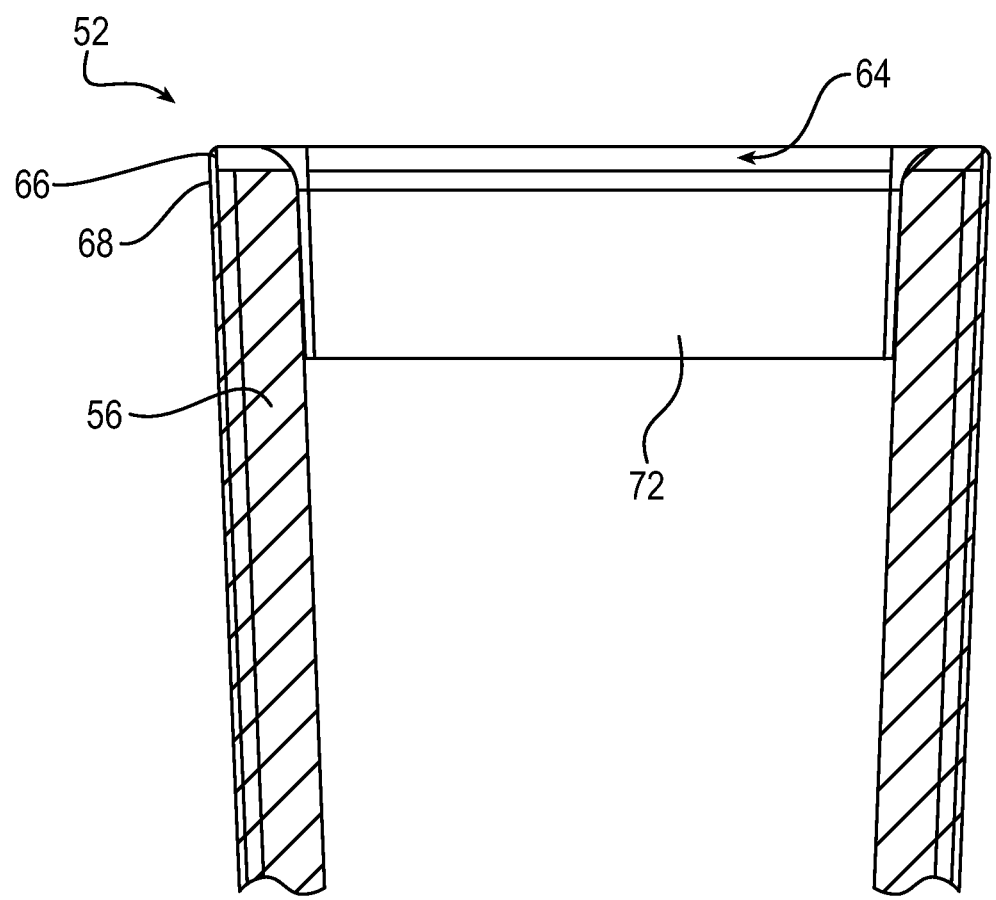
FIG. 8 is a schematic drawing depicting a sectional view of a portion of a pocket filter assembly.

Referring now to FIGS. 7 and 8, the textile cuff 68 may be sewn to the filter element 56 via stitching 70. The semi-rigid planar member 66 provides rigidity for the pocket filter assembly 52. As also shown in FIG. 7, the semi-rigid planar member 66 provides directionality, enabling sealing between the textile cuff 68 and the filter element 56. Using the rectangular semi-rigid planar member 66 is advantageous as compared with conventional pocket filter assemblies that use cylindrical rods. The conventional cylindrical rods may be unable to provide the directionality and sealing achieved by the rectangular semi-rigid planar member 66. As shown in FIGS. 5 and 8, the pocket filter assembly 52 may include at least one rigid support member 72. The rigid support member 72 may be attached to the frame member 64 and insertable within the filter element 56 for supporting the filter element 56 against the housing 54 when the semi-rigid planar member 66 is constrained. The pocket filter assembly 52 shown is an exemplary configuration, and the pocket filter assembly 52 may be operable with more or fewer components than described herein.

In another exemplary configuration, the frame member 64 of the pocket filter assembly 52 may be a plastic coated metal frame. The semi-rigid member 66 may be made of metal, and the first end 60 of the filter element 56 may be encapsulated within a thermoplastic material. The filter element 56 may be attached to the semi-rigid member 66 such that the semi-rigid member 66 may be flexibly moved from the unconstrained position to the constrained position to secure the filter element 56 within the housing 54. An advantage of capturing the semi-rigid member 66 and the filter element 56 within a thermoplastic material is that sewing between components may not be necessary for attachment, enabling a simpler manufacturing process. In an exemplary configuration, the frame member 64 may be manufactured as a single and continuous body that is semi-rigid and flexible.

In still another exemplary configuration, the semi-rigid member 66 may be formed of a suitable thermoplastic material, such that the semi-rigid member 66 does not contain any metal material. An example of a suitable plastic material may be polyurethane. The semi-rigid member 66 may be filled with an additional suitable material to provide extra rigidity. An example of a suitable material is fiberglass, but other materials may be suitable.

A method of securing a filter element within a housing may include steps of attaching a frame at an end of the housing that is engageable with a portion of the filter element for retaining the filter element within the housing. The frame may include a semi-rigid member that is flexibly moveable from an unconstrained position to a constrained position. The method further may include flexibly moving the semi-rigid member to the constrained position to constrain the semi-rigid member and compress a portion of the filter element against the housing. The method may further include arching at least a portion of the semi-rigid member to constrain the semi-rigid member. The method may further include arching the semi-rigid member inwardly towards the housing. The method may further include arching the semi-rigid member outwardly from the housing.

The method may further include sewing the frame to the filter element. The method may further include enclosing the semi-rigid member and the portion of the filter element with a thermoplastic material. The method may still further include filling the thermoplastic material with a rigid material. The method may further include using additional fastening mechanisms, in addition to the semi-rigid member, to secure the filter element within the housing. Examples of suitable fastening mechanisms include nuts, bolts, lock bars, clips, tie rods, springs, and clamps.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter assembly comprising:
   a housing having a closed end and an open end;
   a filter media receivable within the open end of the housing, the filter media having a first end near the open end of the housing and a second end near the closed end of the housing; and
   a frame member engageable with the first end of the filter media and the open end of the housing for securing the filter media within the housing, the frame member including a semi-rigid planar member that is engageable with the first end of the filter media and flexibly moveable between an unconstrained position and a constrained position,
   wherein the semi-rigid planar member has a first end and a second end that are configured to be fixed to the housing, the first end and the second end being arranged on opposite sides of the housing at the open end of the housing, the semi-rigid planar member having a flexible portion connecting the first end and the second end, and
   wherein when in the constrained position, the first end and the second end are fixed to the housing and the flexible portion of the semi-rigid planar member is flexibly arched inwardly toward the closed end of the housing or outwardly away from the open end of the housing to compress the first end of the filter media against the housing for holding the filter media in place, the flexible portion being displaced relative to the first end and the second end during movement from the unconstrained position to the constrained position.

2. The filter assembly according to claim 1, wherein the semi-rigid planar member has a sealing surface for sealing the first end of the filter media with the frame member.

3. The filter assembly according to claim 1, wherein the semi-rigid planar member has a shape that is complementary to a contour of the open end of the housing.

4. The filter assembly according to claim 1, wherein the housing is cylindrical in shape.

5. The filter assembly according to claim 1, wherein the housing is rectangular in shape.

6. The filter assembly according to claim 5, wherein the semi-rigid planar member is rectangular in shape.

7. The filter assembly according to claim 6, wherein the frame member includes a textile cuff surrounding the first end of the filter media, the frame member having an interior portion that contains the semi-rigid planar member.

8. The filter assembly according to claim 7, wherein the textile cuff is sewn into the filter media.

9. The filter assembly according to claim 6, wherein the semi-rigid planar member and the first end of the filter media are enclosed by a thermoplastic material.

10. The filter assembly according to claim 9, wherein the thermoplastic material contains a rigid filler material.

11. The filter assembly according to claim 6, wherein the semi-rigid planar member is formed of a metal material.

12. The filter assembly of claim 1 further comprising a mating frame having a retaining portion extending into the filter media within the housing for retaining the filter media within the housing, the mating frame having a mounting portion mounted to the housing, wherein the semi-rigid planar member is pressed against the mating frame to hold the filter media in place when the semi-rigid member is constrained.

13. The filter assembly of claim 12, wherein the semi-rigid planar member is a spring seal for sealing the mounting portion of the mating frame to a portion of the filter media.

14. A method of securing a filter element within a housing comprising:
    attaching a frame at an end of the housing that is engageable with a portion of the filter element for retaining the filter element within the housing, the frame including a semi-rigid member that is flexibly moveable from an unconstrained position to a constrained position;
    flexibly moving the semi-rigid member to the constrained position to constrain the semi-rigid member and compress a portion of the filter element against the housing; and
    arching at least a portion of the semi-rigid member inwardly toward the housing or outwardly from the housing to constrain the semi-rigid member,
    wherein the semi-rigid member has a first end and a second end that are configured to be fixed to the housing, the first end and the second end being arranged on opposite sides of the housing at an open end of the housing, the semi-rigid member having a flexible portion connecting the first end and the second end, and
    wherein when in the constrained position, the first end and the second end are fixed to the housing and the flexible portion of the semi-rigid member is flexibly arched to compress the first end of the filter media against the housing for holding the filter element in place, the flexible portion being displaced relative to the first end and the second end during movement from the unconstrained position to the constrained position.

15. The method of claim 14 further comprising sewing the frame to the filter element.

16. The method of claim 14 further comprising enclosing the semi-rigid member and the portion of the filter element with a thermoplastic material and filling the thermoplastic material with a rigid material.

* * * * *